United States Patent [19]

Moberly

[11] 3,865,795
[45] Feb. 11, 1975

[54] ARYLENE SULFIDE POLYMERS

[75] Inventor: Charles W. Moberly, Bartlesville, Okla.

[73] Assignee: Phillips Petroleum Company, Bartlesville, Okla.

[22] Filed: Nov. 19, 1973

[21] Appl. No.: 416,824

[52] U.S. Cl. .................................. 260/79.1, 260/79
[51] Int. Cl. .............................................. C08g 23/00
[58] Field of Search ............................ 260/79, 79.1

[56] References Cited
UNITED STATES PATENTS

| | | | |
|---|---|---|---|
| 3,356,656 | 12/1967 | Remes et al. ........................ | 260/79 |
| 3,367,975 | 2/1968 | Liggett .............................. | 260/79.1 |
| 3,538,166 | 11/1970 | Campbell et al. ............... | 260/609 E |

*Primary Examiner*—Melvyn I. Marquis

[57] ABSTRACT

A method of producing arylene sulfide polymers employing (1) polyhalo-substituted aromatic compounds; (2) trithiocarbonates; (3) bases selected from the hydroxides of lithium, sodium, potassium, rubidium, cesium, magnesium, calcium, strontium and barium and the carbonates of sodium, potassium, rubidium and cesium; and, (4) organic amides.

14 Claims, No Drawings

ARYLENE SULFIDE POLYMERS

This invention pertains to the production of arylene sulfide polymers.

In one of its more specific aspects, this invention pertains to a novel method of producing polymers such as those produced by the method of U.S. Pat. No. 3,354,129.

In U.S. Pat. No. 3,354,129, the disclosure of which is incorporated herein by reference, there is disclosed a method of producing polymers from polyhalo-substituted aromatics, alkali metal sulfides and polar organic compounds. There has now been discovered another method of preparing arylene sulfide polymers.

In accordance with one embodiment of the present invention, arylene sulfide polymers are produced by reacting at least one polyhalo-substituted aromatic compound with a mixture in which at least one trithiocarbonate as hereinafter defined, at least one base selected from the hydroxides of lithium, sodium, potassium, rubidium, cesium, magnesium, calcium, strontium and barium, and the carbonates of sodium, potassium, rubidium and cesium and at least one organic amide are contacted.

The polyhalo-substituted aromatic compounds which can be employed in the method of this invention are compounds wherein the halogen atoms are attached to aromatic ring carbon atoms. Suitable compounds include 1,2-dichlorobenzene, 1,3-dichlorobenzene, 1,4-dichlorobenzene and the other polyhalo-substituted aromatic compounds described and exemplified in the aforementioned U.S. Pat. No. 3,354,129. Mixtures of polyhalo-substituted aromatic compounds such as dihalobenzenes can be used, for example, a mixture comprising at least one m-dihalobenzene and at least one p-dihalobenzene.

Trithiocarbonates which are preferred for use in the process of this invention can be represented by the formula

$$RSCSR,$$

wherein R is an alkali metal or a monovalent hydrocarbyl radical selected from alkyl, cycloalkyl, and aryl, and combinations thereof such as alkaryl, aralkyl, and the like, the number of carbon atoms in said hydrocarbyl radical being within the range of 1 to about 12.

Examples of some trithiocarbonates which can be used include lithium trithiocarbonate, sodium trithiocarbonate, potassium trithiocarbonate, rubidium trithiocarbonate, cesium trithiocarbonate, sodium potassium trithiocarbonate, sodium ethyl trithiocarbonate, dimethyl trithiocarbonate, ethyl propyl trithiocarbonate, butyl 2-ethylhexyl trithiocarbonate, isopropyl decyl trithiocarbonate, didodecyl trithiocarbonate, cyclohexyl 3-methylcyclopentyl trithiocarbonate, isobutyl cyclohexylmethyl trithiocarbonate, diphenyl trithiocarbonate, benzyl p-tolyl trithiocarbonate, and the like, and mixtures thereof.

Bases which can be employed in the method of this invention include lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate, and mixtures thereof. If desired, the hydroxide can be produced in situ by the reaction of the corresponding oxide with water.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures thereof.

The components used in the preparation of the arylene sulfide polymer can be introduced into contact in any order. Water which can be present in any composite formed from any of the preceding compounds, for example, the composite formed from the polyhalo-substituted aromatic compound, the trithiocarbonate, the base and the organic amide or which can be present in a composite formed from the trithiocarbonate, the base and the organic amide can be removed, for example, by distillation, prior to conducting the polymerization reaction. Such water can be present as an impurity, as a solvent or diluent or as water of hydration. Regardless of whether a water removal step is employed, at least a portion of the composition formed from the polyhalo-substituted aromatic compound, the trithiocarbonate, the base and the organic amide is maintained at polymerization conditions to produce the arylene sulfide polymer.

The ratio of reactants can vary considerably but about 2.7 to about 10, and preferably about 2.9 to about 7, gram-moles of the polyhalo-substituted aromatic compound will generally be employed per gram-mole of trithiocarbonate. The base generally will be employed in an amount within the range of from about 2 to about 8, and preferably from about 3 to about 6, gram-equivalents per gram-mole of trithiocarbonate. As used herein, one gram-equivalent of the hydroxides of magnesium, calcium, strontium and barium represents the same amount as one-half gram-mole of these substances, whereas for the hydroxides of lithium, sodium, potassium, rubidium, and cesium, or for the carbonates of sodium, potassium, rubidium, and cesium, the amount represented by one gram-equivalent is considered to be the same as that represented by 1 gram-mole.

The amount of organic amide employed can also vary over a wide range but will generally be within the range of from about 100 grams to about 2500 grams per gram-mole of polyhalo-substituted aromatic compound employed.

The temperature at which the polymerization can be conducted can vary over a wide range and will generally be within the range of from about 125° C. to about 450° C. and preferably within the range of from about 175° C. to about 350° C. The reaction time will be within the range of from about 10 minutes to about 3 days and preferably from about 1 hour to about 8 hours. The pressure need be only sufficient to maintain the polyhalo-substituted aromatic compound and the organic amide substantially in the liquid phase and to retain the sulfur source therein.

The arylene sulfide polymers produced by the method of this invention can be separated from the reaction mixture by conventional procedures, for example, by filtration of the polymer followed by washing with water, or by dilution of the reaction mixture with water, followed by filtration and water washing of the polymer.

The arylene sulfide polymers prepared by the process of this invention can be blended with fillers, pigments, extenders, other polymers and the like. They can be cured through crosslinking and/or chain extension, for example, by heating at temperatures up to about 480° C. in the presence of a free oxygen-containing gas, to provide cured products having high thermal stability and good chemical resistance. They are useful in the production of coatings, films, molded objects and fibers.

It is within the scope of this invention to bring the polyhalo-substituted aromatic compound, the trithiocarbonate, the base and the organic amide into contact in any order.

Also, it is within the scope of this invention to remove water from any combination of the aforesaid compounds.

The previous statements are based upon the following examples.

EXAMPLES

In the following examples, the crystalline melting point, (Tm), was determined by differential thermal analysis. Values for inherent viscosity were determinted at 206° C. in 1-chloronaphthalene at a polymer concentration of 0.4 g/100 ml solution.

The following examples were carried out in a 1 liter stirred reactor.

In each instance, the reactor was charged with 275 grams of N-methyl-2-pyrrolidone (NMP). The individual amount of sodium hydroxide (97 or 98%) was then added. Sodium trithiocarbonate solution in water was then added and the reactor closed and flushed with nitrogen.

With 0.05 SCFH nitrogen flowing into the reactor and out through a distillation tube connected to the condenser and receiver, the reactor contents were heated to 196° C. to distill out water.

When the distillation and dehydration were complete, nitrogen flow was discontinued and the reactor was closed, the contents were cooled to about 191° C. and 0.51 mole of 1,4-dichlorobenzene (DCB) as a solution with 52 grams of NMP was added under nitrogen pressure.

The reactor pressure was adjusted to about 5 psig by venting, after which the temperature was increased to 246° C., at which temperature the mixture was maintained for about 3 hours.

The reaction mixture was thereafter cooled to about 66° C., the reactor opened and the poly(p-phenylene sulfide) product recovered. The product was washed with methanol and with hot water. The washed polymer was dried in a vacuum oven at 80° C. or 100° C. using a nitrogen sweep. Yields were calculated on the basis of a theoretical yield of 108 grams of polymer per gram-atom of sulfur in the trithiocarbonate employed.

The spectra of all samples showed absorptions characteristic of poly(p-phenylene sulfide) with some minor additional absorption (8.08$\mu$).

Data were as follows:

| Run No. | Gram-moles Charged | | | Max. Press., psig | Polymer Yield % | Polymer Properties | | |
|---|---|---|---|---|---|---|---|---|
| | Na$_2$CS$_3$ | NaOH | DCB | | | Inherent Visc. | Ash, Wt.% | Tm, °C. |
| 1 | 0.165a | 0.677 | 0.51 | 187 | 63 | 0.03 | 1.2 | — |
| 2 | 0.165a | 0.833 | 0.51 | 72 | 64 | 0.05 | 3.2 | 277 |
| 3 | 0.165b | 0.833 | 1.02 | 90 | 81 | 0.03 | 0.75 | — |
| 4 | 0.165b | 0.833 | 0.51 | 95 | 84 | 0.08 | 1.8 | — |

(a) Based on supplier's analysis of Na$_2$CS$_3$ content of 40 weight percent.
(b) Based on analysis for sulfur of 18.6 weight percent in the Na$_2$CS$_3$ solution.

As illustrated by the above, the use of a trithiocarbonate as the sulfur source produces poly(p-phenylene sulfide) of desirable properties in acceptable yields.

It will further be evident from the foregoing that various modifications can be made to the method of this invention. Such are considered, however, to be within the scope thereof.

What is claimed is:

1. A method of producing a polymer which comprises:
   a. forming a composition by contacting at least one polyhalo-substituted aromatic compound wherein the halogen atoms are attached to aromatic ring carbon atoms, at least one base selected from the hydroxides of lithium, sodium, potassium, rubidium, cesium, magnesium, calcium, strontium and barium and the carbonates of sodium, potassium, rubidium, and cesium, at least one organic amide and at least one trithiocarbonate having the formula $$\text{RSCSR},$$
$$\overset{\text{S}}{\overset{\|}{}}$$

wherein each R is an alkali metal or a monovalent hydrocarbyl radical selected from alkyl, cycloalkyl, and aryl and combinations of said radicals, the number of carbon atoms in said hydrocarbyl radical being within the range of 1 to about 12; and,
   b. maintaining at least a portion of said composition at polymerization conditions to produce said polymer.

2. The method of claim 1 in which said polyhalo-substituted aromatic compound is employed in an amount within the range of from about 2.7 to about 10 gram-moles per gram-mole of trithiocarbonate.

3. The method of claim 1 in which said base is employed in an amount within the range of from about 2 to about 8 gram-equivalents per gram-mole of trithiocarbonate.

4. The method of claim 2 in which said organic amide is employed in an amount within the range of from about 100 to about 2500 grams per gram-mole of polyhalo-substituted aromatic compound.

5. The method of claim 1 in which said polyhalo-substituted aromatic compound is p-dichlorobenzene, said base is sodium hydroxide, said organic amide is N-methyl-2-pyrrolidone and said trithiocarbonate is sodium trithiocarbonate.

6. The method of claim 1 in which said trithiocarbonate is sodium trithiocarbonate and water is removed from said composition prior to maintaining said composition at polymerization conditions.

7. The method of claim 5 in which p-dichlorobenzene is employed in an amount within the range of from about 2.7 to about 10 gram-moles per gram-mole of sodium trithiocarbonate and sodium hydroxide is employed in an amount within the range of from about 2 to about 8 gram-equivalents per gram-mole of sodium trithiocarbonate.

8. A method of producing a polymer which comprises:
 a. contacting at least one base, at least one organic amide and at least one trithiocarbonate to form a first composition, said base being selected from the hydroxides of lithium, sodium, potassium, rubidium, cesium, magnesium, calcium, strontium and barium and the carbonates of sodium, potassium, rubidium and cesium, said trithiocarbonate having the formula $$\underset{\substack{\|\\ \text{RSCSR}}}{\text{S}}$$

wherein each R is an alkali metal or a monovalent hydrocarbyl radical selected from alkyl, cycloalkyl, and aryl and combinations of said radicals, the number of carbon atoms in said hydrocarbyl radical being within the range of 1 to about 12;
 b. contacting at least a portion of said first composition with at least one polyhalo-substituted aromatic compound wherein the halogen atoms are attached to aromatic ring carbon atoms to form a second composition; and,
 c. maintaining said second composition at polymerization conditions to form said polymer.

9. The method of claim 8 in which said polyhalo-substituted aromatic compound is employed in an amount within the range of from about 2.7 to about 10 gram-moles per gram-mole of trithiocarbonate.

10. The method of claim 8 in which said base is employed in an amount within the range of from about 2 to about 8 gram-equivalents per gram-mole of trithiocarbonate.

11. The method of claim 9 in which said organic amide is employed in an amount within the range of from about 100 to about 2500 grams per gram-mole of polyhalo-substituted aromatic compound.

12. The method of claim 8 in which said polyhalo-substituted aromatic compound is p-dichlorobenzene, said base is sodium hydroxide, said organic amide is N-methyl-2-pyrrolidone and said trithiocarbonate is sodium trithiocarbonate.

13. The method of claim 8 in which said trithiocarbonate is sodium trithiocarbonate and water is removed from said first composition prior to maintaining said second composition at polymerization conditions.

14. The method of claim 12 in which p-dichlorobenzene is employed in an amount within the range of from about 2.7 to about 10 gram-moles per gram-mole of sodium trithiocarbonate and sodium hydroxide is employed in an amount within the range of from about 2 to about 8 gram-equivalents per gram-mole of sodium trithiocarbonate.

* * * * *